United States Patent
Li et al.

(10) Patent No.: US 11,525,514 B2
(45) Date of Patent: Dec. 13, 2022

(54) MAGNETIC LIQUID SEALING DEVICE

(71) Applicant: Tsinghua University, Beijing (CN)

(72) Inventors: Decai Li, Beijing (CN); Yingsong Li, Beijing (CN); Xiao Liu, Beijing (CN); Sijie Ren, Beijing (CN); Pengdong Han, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 124 days.

(21) Appl. No.: 17/313,391

(22) Filed: May 6, 2021

(65) Prior Publication Data

US 2022/0205542 A1 Jun. 30, 2022

(30) Foreign Application Priority Data

Dec. 29, 2020 (CN) .......................... 202011598777.4

(51) Int. Cl.
*F16J 15/43* (2006.01)
*F16C 33/76* (2006.01)

(52) U.S. Cl.
CPC ............. *F16J 15/43* (2013.01); *F16C 33/765* (2013.01)

(58) Field of Classification Search
CPC ...................................................... F16J 15/43
See application file for complete search history.

(56) References Cited

U.S. PATENT DOCUMENTS

| | | | |
|---|---|---|---|
| 3,092,426 A * | 6/1963 | Romney | B61F 17/08 |
| | | | 384/188 |
| 11,092,241 B1 * | 8/2021 | Li | F16J 15/43 |
| 2010/0171271 A1 * | 7/2010 | Kung | F16J 15/43 |
| | | | 277/410 |
| 2010/0224814 A1 * | 9/2010 | Ohlson | F16J 15/062 |
| | | | 251/326 |
| 2019/0257788 A1 * | 8/2019 | Dozortsev | G01N 35/0092 |
| 2022/0128111 A1 * | 4/2022 | Li | F16L 59/029 |

* cited by examiner

Primary Examiner — Vishal A Patel
(74) Attorney, Agent, or Firm — Hodgson Russ LLP

(57) ABSTRACT

A magnetic liquid sealing device includes a housing, a rotating shaft, a first pole shoe, a second pole shoe, a plurality of permanent magnets, a rotation ring, and a sealing block. A chamber is defined in the housing including a first housing and a second housing. The rotating shaft passes through and is rotatable. The first pole shoe and the second pole shoe surround the rotating shaft and are spaced apart. The plurality of permanent magnets between the first pole shoe and the second pole shoe are spaced apart. The rotation ring surrounds the rotating shaft and is rotatable. The first housing, the rotation ring, and the second housing define the chamber. The rotation ring on outer sides of the plurality of permanent magnets is defined with a through hole running through the rotation ring. The sealing block in the through hole is detachably connected to the rotation ring.

9 Claims, 2 Drawing Sheets

MAGNETIC LIQUID SEALING DEVICE

CROSS REFERENCE TO RELATED APPLICATION

The present application claims the benefit of and priority to Chinese Application No. 202011598777.4, filed on Dec. 29, 2020, the entire disclosures of which is incorporated herein by reference.

TECHNICAL FIELD

The present disclosure relates to a field of liquid sealing technologies, and more particularly to magnetic liquid sealing device.

BACKGROUND

Components in a magnetic liquid sealing device need to be assembled from a shaft end of a rotation shaft. When a shaft diameter of the rotation shaft is very large, it is difficult for the rotation shaft to pass through a housing under magnetic field force.

A split magnetic liquid sealing device is proposed in a related art. Shaft end parts do not need to be disassembled during mounting and disassembly of the split magnetic liquid sealing device, which improves working efficiency. However, in this manner, distribution of magnetic liquid on adjacent pole teeth is uneven, and even no magnetic liquid seal is formed on some pole teeth, causing a reduction of actual pressure resistance of the sealing device.

SUMMARY

The present disclosure seeks to solve one of the technical problems in a related art to at least some extent. Therefore, embodiments of the present disclosure provide a magnetic liquid sealing device that may decrease the interference of a magnetic field with a rotating shaft and reduce the mounting difficulty of the rotating shaft in the process of mounting the rotating shaft.

The magnetic liquid sealing device according to the embodiments of the present disclosure includes: a housing, a chamber being defined in the housing and the housing including a first housing and a second housing; a rotating shaft passing through the housing and rotatable relative to the housing, at least a part of the rotating shaft being located in the chamber, and the first housing and the second housing being opposite to each other in an axial direction of the rotating shaft; a first pole shoe and a second pole shoe both located in the chamber and surrounding the rotating shaft, respectively, the first pole shoe and the second pole shoe being spaced apart in the axial direction of the rotating shaft, magnetic liquid being filled between the first pole shoe and the rotating shaft, and magnetic liquid being filled between the second pole shoe and the rotating shaft; a plurality of permanent magnets located in the chamber, located between the first pole shoe and the second pole shoe, and spaced apart in a circumferential direction of the rotating shaft, the permanent magnet being provided with a first magnetic pole and a second magnetic pole opposite to each other in the axial direction of the rotating shaft; a rotation ring surrounding the rotating shaft and rotatable relative to the housing, the first housing, the rotation ring, and the second housing being successively connected in the axial direction of the rotating shaft, the first housing, the rotation ring, and the second housing defining the chamber, the rotation ring being located on outer sides of the plurality of permanent magnets, and the rotation ring being defined with a through hole running through the rotation ring along a radial direction of the rotating shaft; and a sealing block detachably connected to the rotation ring and arranged in the through hole.

The magnetic liquid sealing device according to the embodiments of the present disclosure may reduce the interference of a magnetic field to the rotating shaft and reduce the mounting difficulty of the rotating shaft in a process of mounting the rotating shaft.

DETAILED DESCRIPTION

Embodiments of the present disclosure are described in detail below. Examples of the embodiments are illustrated in the accompanying drawings. The embodiments described below with reference to the accompanying drawings are exemplary, are merely used to explain the present disclosure, and cannot be construed to limit the present disclosure.

Figure 1:
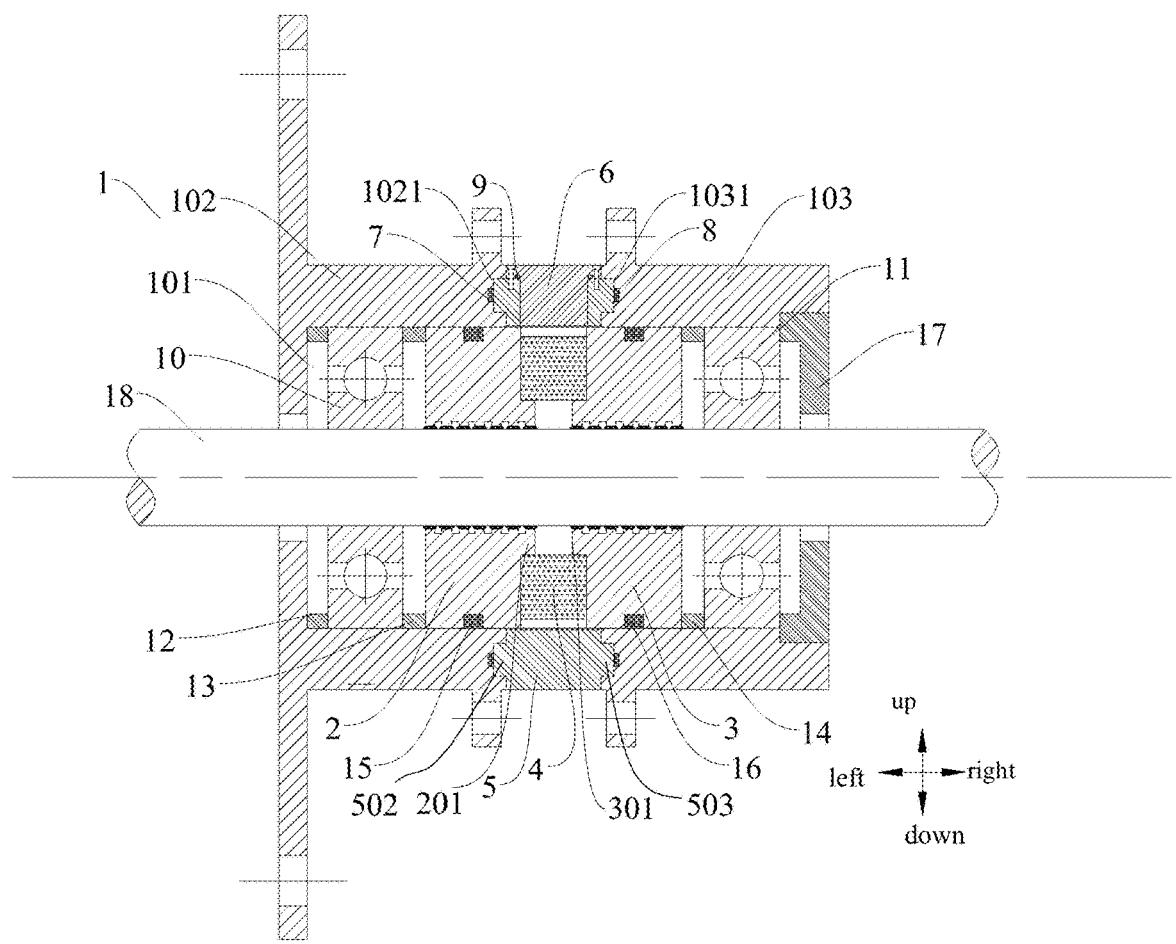
FIG. 1 is a schematic view of structure of a magnetic liquid sealing device according to an embodiment of the present disclosure.
Figure 2:
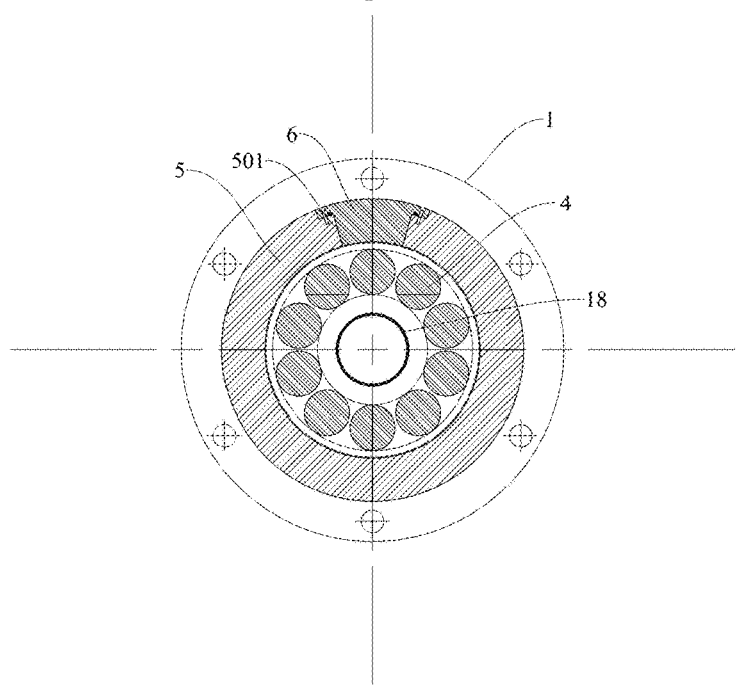
FIG. 2 is a schematic sectional view of an A-A section of the magnetic liquid sealing device illustrated in FIG. 1.
Figure 3:
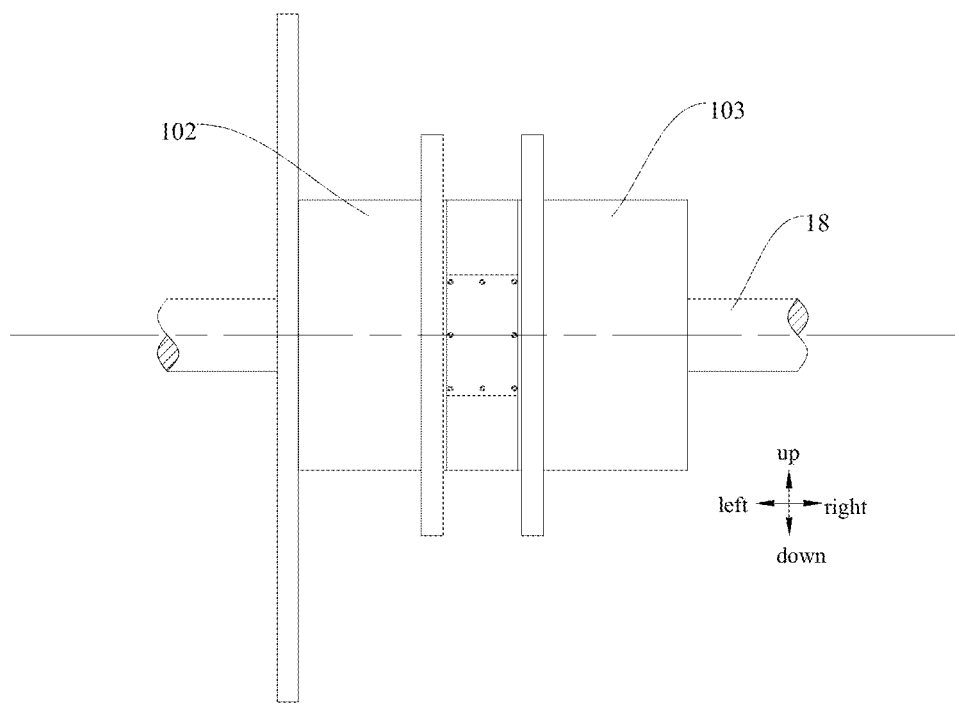
FIG. 3 is a schematic top view of the magnetic liquid sealing device illustrated in FIG. 1.

As illustrated in FIG. 1 to FIG. 3, a magnetic liquid sealing device according to an embodiment of the present disclosure includes a housing 1, a rotating shaft 18, a first pole shoe 2, a second pole shoe 3, a plurality of permanent magnets 4, a rotation ring 5, and a sealing block 6.

A chamber 101 is defined in the housing 1. The housing 1 includes a first housing 102 and a second housing 103.

As illustrated in FIG. 1, the first housing 102 and the second housing 103 are opposite to each other in a left-right direction. A left end of the first housing 102 is provided with a flange portion adapted to be connected with a sealed device for sealing a sealing cavity in the sealed device. A right end of the first housing 102 is provided with an annular collar, and a left end of the second housing 103 is also provided with an annular collar. The annular collar on the first housing 102 and the annular collar on the second housing 103 are both provided with a threaded hole arranged along the left-right direction. A bolt passes through the threaded hole to connect the first housing 102 with the second housing 103.

The rotating shaft 18 passes through the housing 1 and is rotatable relative to the housing 1. At least a part of the rotating shaft 18 is located in the chamber 101. The first housing 102 and the second housing 103 are opposite to each other in an axial direction of the rotating shaft 18. As illustrated in FIG. 1, the rotating shaft 18 is rotatably provided in the chamber 101 along the left-right direction. Left and right ends of the rotating shaft 18 both extend out of the housing 1.

The first pole shoe 2 and the second pole shoe 3 are both located in the chamber 101, and the first pole shoe 2 and the second pole shoe 3 surround the rotating shaft 18, respectively. The first pole shoe 2 and the second pole shoe 3 are spaced apart in the axial direction (the left-right direction as illustrated in FIG. 1) of the rotating shaft 18. Magnetic liquid is filled between the first pole shoe 2 and the rotating shaft 18, and magnetic liquid is filled between the second pole shoe 3 and the rotating shaft 18.

As illustrated in FIG. 1, an inner circumferential surface of the first pole shoe 2 is provided with a plurality of first pole teeth spaced apart in the left-right direction. The first pole teeth extend along an up-down direction, and a contour of the first pole teeth on an axial section of the rotating shaft 18 is substantially rectangular. An inner side of the first pole tooth and an outer circumference of the rotating shaft 18 is defined with a predetermined gap in the up-down direction. The magnetic liquid is filled in the predetermined gap.

An inner circumferential surface of the second pole shoe 3 is provided with a plurality of second pole teeth spaced apart in the left-right direction. The second pole teeth extend along the up-down direction, and a contour of the second pole teeth on the axial section of the rotating shaft 18 is substantially rectangular. An inner side of the second pole tooth and the outer circumference of the rotating shaft 18 is defined with a predetermined gap in the up-down direction. The magnetic liquid is filled in the predetermined gap.

The plurality of permanent magnets 4 are located in the chamber 101. The plurality of permanent magnets 4 are located between the first pole shoe 2 and the second pole shoe 3, and the plurality of permanent magnets 4 are spaced apart in a circumferential direction of the rotating shaft 18. The permanent magnet is provided with a first magnetic pole and a second magnetic pole opposite to each other in the axial direction of the rotating shaft.

As illustrated in FIG. 2, the permanent magnet 4 is cylindrical, and the plurality of permanent magnets 4 are of the same dimension. A left end face of the permanent magnet 4 is in contact with a right end face of the first pole shoe 2. A right end face of the permanent magnet 4 is in contact with a left end face of the second pole shoe 3. An outer circumferential surface of the permanent magnet 4 has a predetermined distance from an outer circumferential surface of the rotating shaft 18 in the up-down direction.

The rotation ring 5 surrounds the rotating shaft 18 and is rotatable relative to the housing 1. The first housing 102, the rotation ring 5, and the second housing 103 are successively connected in the axial direction of the rotating shaft 18. The first housing 102, the rotation ring 5, and the second housing 103 are defined with the chamber 101. The rotation ring 5 is located at outer sides of the plurality of permanent magnets 4. The rotation ring 5 is defined with a through hole 501. The through hole 501 runs through the rotation ring 5 along a radial direction (the up-down direction as illustrated in FIG. 1) of the rotating shaft 18.

As illustrated in FIG. 1 and FIG. 2, the first housing 102, the rotation ring 5, and the second housing 103 are successively connected in the left-right direction, and an inner circumferential surface of the rotation ring 5 is flush with inner circumferential surfaces of the first housing 102 and the second housing 103.

The sealing block 6 is detachably connected to the rotation ring 5, and the sealing block 6 is arranged in the through hole 501.

As illustrated in FIG. 1, the sealing block 6 is connected to the rotation ring 5 through a bolt. An inner side of the sealing block 6 is flush with the inner circumferential surface of the rotation ring 5. An outer side of the sealing block 6 is flush with the inner circumferential surfaces of the first housing 102 and the second housing 103. It is may be understood that a detachable connection manner between the sealing block 6 and the rotation ring 5 is not limited to the above, which may also be, for example, a clamping connection.

According to the magnetic liquid sealing device of the embodiment of the present application, the through hole 501 is in communication with the chamber 101 and an outside. The permanent magnet 4 may be taken out through the through hole 501 and a magnetic pole direction of the permanent magnet 4 may be adjusted, and magnetic poles of the plurality of permanent magnets 4 may be adjusted by rotating the rotation ring 5. By adjusting the arrangement of the magnetic poles of the plurality of permanent magnets 4, only a small part of magnetic force lines pass through the rotating shaft 18, thereby enabling to reduce the interference of a magnetic field to the rotating shaft 18 and reduce the mounting difficulty of the rotating shaft 18 in a process of mounting the rotating shaft 18. Moreover, the first housing 102 and the second housing 103 are detachably connected, so as to facilitate mounting and disassembly of parts and components.

In some embodiments, one side of the first housing 102 adjacent to the second housing 103 (a right side of the first housing 102 as illustrated in FIG. 1) is provided with a first annular groove 1021, and one side of the second housing 103 adjacent to the first housing 102 (a left side of the second housing 103 as illustrated in FIG. 1) is provided with a second annular groove 1031. One side of the rotation ring 5 adjacent to the first housing 102 (a left side of the rotation ring 5 as illustrated in FIG. 1) is provided with a first annular projection 502. One side of the rotation ring 5 adjacent to the second housing 103 (a right side of the rotation ring 5 as illustrated in FIG. 1) is provided with a second annular projection 503. The first annular projection 502 is fitted with the first annular groove 1021, and the second annular projection 503 is fitted with the second annular groove 1031.

As illustrated in FIG. 1, a dimension of the first annular projection 502 matches that of the first annular groove 1021, and a dimension of the second annular projection 503 matches that of the second annular groove 1031.

According to the magnetic liquid sealing device of the embodiment of the present application, the first annular projection 502 is fitted with the first annular groove 1021 and the second annular projection 503 is fitted with the second annular groove 1031, so as to improve assembly accuracy between the rotation ring 5 and the first housing 102 as well as the second housing 103.

In some embodiments, a dimension of the through hole 501 in the axial direction of the rotating shaft 18 is D1, a dimension of the permanent magnet 4 in the axial direction of the rotating shaft 18 is D2, D1≥D2, and a dimension of the through hole 501 in the circumferential direction of the rotating shaft 18 is greater than or equal to a diameter of the permanent magnet 4.

It needs to be noted that in order to facilitate the mounting and removal of the permanent magnet 4, the dimension of the through hole 501 in the left-right direction is greater than that of the permanent magnet 4 in the left-right direction, and the dimension of the through hole 501 in the circumferential direction of the rotating shaft 18 is greater than that of the permanent magnet 4.

In some embodiments, one side of the first pole shoe 2 adjacent to the second pole shoe 3 is provided with a third annular projection 201, one side of the second pole shoe 3 adjacent to the first pole shoe 2 is provided with a fourth annular projection 301, and an outer circumferential surface of the permanent magnet 4 is in contact with outer circumferential surfaces of the third annular projection 201 and the fourth annular projection 301, respectively.

According to the magnetic liquid sealing device of the embodiment of the present disclosure, mounting accuracy of the permanent magnet 4 is improved through the arrangement of the third annular projection 201 and the fourth annular projection 301.

In some embodiments, the magnetic liquid sealing device further includes a first sealing ring 7 and a second sealing ring 8. The first sealing ring 7 is arranged between the rotation ring 5 and the first housing 102, and the second sealing ring 8 is arranged between the rotation ring 5 and the second housing 103.

As illustrated in FIG. 1, the first sealing ring 7 is arranged in the first annular groove 1021, and the second sealing ring 8 is arranged in the second annular groove 1031. According to the magnetic liquid sealing device of the embodiment of the present application, through the arrangement of the first sealing ring 7 and the second sealing ring 8, the leakage of magnetic liquid between the rotation ring 5 and the pole shoes is avoided, and the tightness of the magnetic liquid sealing device is improved.

In some embodiments, the magnetic liquid sealing device further includes a third sealing ring 9. The third sealing ring 9 is arranged between the sealing block 6 and the rotation ring 5.

According to the magnetic liquid sealing device of the embodiment of the present application, through the arrangement of the third sealing ring 9, the leakage of the magnetic liquid between the rotation ring 5 and the sealing block 6 is avoided, and the tightness of the magnetic liquid sealing device is improved.

In some embodiments, the magnetic liquid sealing device further includes a first bearing 10 and a second bearing 11. The first bearing 10 and the second bearing 11 are both located in the chamber 101. The first bearing 10 and the second bearing 11 are fitted over the rotating shaft 18, respectively, and the first bearing 10 and the second bearing 11 are spaced apart in the axial direction of the rotating shaft 18. The first pole shoe 2, the second pole shoe 3, and the permanent magnets 4 are all located between the first bearing 10 and the second bearing 11.

As illustrated in FIG. 1, the first bearing 10 is arranged in the first housing 102, and an outer circumference of the first bearing 10 is in contact with an inner wall of the first housing 102. The second bearing 11 is arranged in the second housing 103, and an outer circumference of the second bearing 11 is in contact with an inner wall of the second housing 103. In the magnetic liquid sealing device according to the embodiment of the present application, through the arrangement of the first bearing 10 and the second bearing 11, friction between the rotating shaft 18 and the housing 1 is reduced, and radial run-out of the rotating shaft is prevented such that the rotation of the rotating shaft 18 is more stable.

In some embodiments, the magnetic liquid sealing device further includes a first positioning member 12, a second positioning member 13, and a third positioning member 14 all located in the chamber 101, and the first positioning member 12, the second positioning member 13, and the third positioning member 14 are fitted over the rotating shaft 18, respectively. The first bearing 10 is located between the first positioning member 12 and the second positioning member 13, and the third positioning member 14 is located between the second pole shoe 3 and the second bearing 11.

As illustrated in FIG. 1, a right end face of the first positioning member 12 is in contact with a left end face of the first bearing 10, a left end face of the second positioning member 13 is in contact with a right end face of the first bearing 10, a right end face of the second positioning member 13 is in contact with a left end face of the first pole shoe 2, a left end face of the third positioning member 14 is in contact with a right end face of the second pole shoe 3, and a right end face of the third positioning member 14 is in contact with a left end face of the second bearing 11.

In the magnetic liquid sealing device according to the embodiment of the present application, through the arrangement of the first positioning member 12, the second positioning member 13, and the third positioning member 14, axial positions of the first bearing 10 and the second bearing 11 are positioned and fixed, so as to prevent axial displacement of the first bearing 10 and the second bearing 11 and improve the operation stability of the magnetic liquid sealing device.

In some embodiments, an outer circumferential surface of the first pole shoe 2 and an outer circumferential surface of the second pole shoe 3 are both defined with a groove, the magnetic liquid sealing device further includes a fourth sealing ring 15 and a fifth sealing ring 16, the fourth sealing ring 15 is arranged in the groove on the outer circumferential surface of the first pole shoe 2, and the fifth sealing ring 16 is arranged in the groove on the outer circumferential surface of the second pole shoe 3.

In the magnetic liquid sealing device according to the embodiment of the present application, through the arrangement of the fourth sealing ring 15 and the fifth sealing ring 16, the leakage of the magnetic liquid between the outer circumferential surfaces of the pole shoes and an inner wall surface of the housing 1 may be avoided and the tightness of the magnetic liquid sealing device may be improved.

In some embodiments, the magnetic liquid sealing device further includes an end cover 17 arranged on one side of the housing 1, and the rotating shaft 18 passes through the end cover 17. The end cover 17 is configured to seal the chamber 101. As illustrated in FIG. 1, the end cover 17 is connected to the second housing 103 and is arranged at a right end of the second housing 103. The left end face of the second bearing 11 is in contact with the right end face of the second bearing 11.

Magnetic liquid sealing devices in some specific examples of the present disclosure are described below with reference to FIG. 1 to FIG. 3.

The magnetic liquid sealing device according to the embodiments of the present disclosure includes a housing 1, a rotating shaft 18, a first pole shoe 2, a second pole shoe 3, a plurality of permanent magnets 4, a rotation ring 5, a sealing block 6, a first sealing ring 7, a second sealing ring 8, a third sealing ring 9, a first bearing 10, a second bearing 11, a first positioning member 12, a second positioning member 13, a third positioning member 14, a fourth sealing ring 15, a fifth sealing ring 16, and an end cover 17.

A chamber 101 is defined in the housing 1. The housing 1 includes a first housing 102 and a second housing 103 opposite to each other in a left-right direction. A right end of the first housing 102 is provided with an annular collar, and a left end of the second housing 103 is also provided with an annular collar. The annular collar on the first housing 102 and the annular collar on the second housing 103 are both provided with a threaded hole arranged along the left-right direction. A bolt passes through the threaded hole to connect the first housing 102 with the second housing 103.

A right side of the first housing 102 is provided with a first annular groove 1021, a left side of the second housing 103 is provided with a second annular groove 1031, a left side of the rotation ring 5 is provided with a first annular projection 502, a right side of the rotation ring 5 is provided with a second annular projection 503, the first annular projection 502 is fitted with the first annular groove 1021, and the second annular projection 503 is fitted with the second annular groove 1031.

The rotating shaft 18 passes through the housing 1 and is rotatable relative to the housing 1. The rotating shaft 18 is rotatably arranged in the chamber 101 along the left-right direction. Left and right ends of the rotating shaft 18 both extend out of the housing 1.

The first pole shoe 2 and the second pole shoe 3 are both located in the chamber 101, and the first pole shoe 2 and the second pole shoe 3 surround the rotating shaft 18, respectively. The first pole shoe 2 and the second pole shoe 3 are spaced apart in the left-right direction. Magnetic liquid is filled between the first pole shoe 2 and the rotating shaft 18, and magnetic liquid is filled between the second pole shoe 3 and the rotating shaft 18.

One side of the first pole shoe 2 adjacent to the second pole shoe 3 is provided with a third annular projection 201, one side of the second pole shoe 3 adjacent to the first pole shoe 2 is provided with a fourth annular projection 301, and an outer circumferential surface of the permanent magnet 4 is in contact with outer circumferential surfaces of the third annular projection 201 and the fourth annular projection 301, respectively.

The plurality of permanent magnets 4 are located in the chamber 101. The plurality of permanent magnets 4 are located between the first pole shoe 2 and the second pole shoe 3, and the plurality of permanent magnets 4 are spaced apart in a circumferential direction of the rotating shaft 18. A left end face of the permanent magnet 4 is in contact with a right end face of the first pole shoe 2, and a right end face of the permanent magnet 4 is in contact with a left end face of the second pole shoe 3. The outer circumferential surface of the permanent magnet 4 has a predetermined distance from an outer circumferential surface of the rotating shaft 18 in the up-down direction.

The rotation ring 5 surrounds the rotating shaft 18 and is rotatable relative to the housing 1. The first housing 102, the rotation ring 5, and the second housing 103 are successively connected in the left-right direction. The first housing 102, the rotation ring 5, and the second housing 103 are defined with the chamber 101. The rotation ring 5 is located at outer sides of the plurality of permanent magnets 4. The rotation ring 5 is defined with a through hole 501. The through hole 501 runs through the rotation ring 5 along the up-down direction.

An inner circumferential surface of the rotation ring 5 is flush with inner circumferential surfaces of the first housing 102 and the second housing 103.

The sealing block 6 is detachably connected to the rotation ring 5, and the sealing block 6 is arranged in the through hole 501.

The first sealing ring 7 is arranged between the rotation ring 5 and the first housing 102, the second sealing ring 8 is arranged between the rotation ring 5 and the second housing 103, the first sealing ring 7 is arranged in the first annular groove 1021, and the second sealing ring 8 is arranged in the second annular groove 1031.

The third sealing ring 9 is arranged between the sealing block 6 and the rotation ring 5.

The first bearing 10 and the second bearing 11 are both located in the chamber 101. The first bearing 10 and the second bearing 11 are fitted over the rotating shaft 18, respectively, and the first bearing 10 and the second bearing 11 are spaced apart in the axial direction of the rotating shaft 18. The first pole shoe 2, the second pole shoe 3, and the permanent magnets 4 are all located between the first bearing 10 and the second bearing 11. The first bearing 10 is arranged in the first housing 102, and an outer circumference of the first bearing 10 is in contact with an inner wall of the first housing 102, the second bearing 11 is arranged in the second housing 103, and an outer circumference of the second bearing 11 is in contact with an inner wall of the second housing 103.

The first positioning member 12, the second positioning member 13, and the third positioning member 14 are all located in the chamber 101, and are fitted over the rotating shaft 18, respectively. The first bearing 10 is located between the first positioning member 12 and the second positioning member 13, and the third positioning member 14 is located between the second pole shoe 3 and the second bearing 11. A right end face of the first positioning member 12 is in contact with a left end face of the first bearing 10, a left end face of the second positioning member 13 is in contact with a right end face of the first bearing 10, a right end face of the second positioning member 13 is in contact with a left end face of the first pole shoe 2, a left end face of the third positioning member 14 is in contact with a right end face of the second pole shoe 3, and a right end face of the third positioning member 14 is in contact with a left end face of the second bearing 11.

An outer circumferential surface of the first pole shoe 2 and an outer circumferential surface of the second pole shoe 3 are both provided with a groove. The fourth sealing ring 15 is arranged in the groove on the outer circumferential surface of the first pole shoe 2, and the fifth sealing ring 16 is arranged in the groove on the outer circumferential surface of the second pole shoe 3.

The end cover 17 is connected to the second housing 103 and is arranged at a right end of the second housing 103. The left end face of the second bearing 11 is in contact with the right end face of the second bearing 11, and the rotating shaft 18 passes through the end cover 17. The end cover 17 is configured to seal the chamber 101.

An operation principle of a magnetic liquid sealing device according to the embodiments of the present disclosure is described below with reference to FIG. 1 to FIG. 3.

Before the rotating shaft 18 is mounted, magnetic poles on the same side of the plurality of permanent magnets 4 are arranged differently, and that is, the magnetic poles on the same side of the permanent magnets 4 are arranged according to an arrangement rule of N-S-N-S, such that a magnetic path is formed between the plurality of permanent magnets 4. In this case, when the rotating shaft 18 is mounted, most magnetic force lines may pass through the N-S poles on the same side, and only a small part passes through the rotating shaft 18, thus reducing the mounting difficulty of the rotating shaft 18. After the rotating shaft 18 is mounted, the sealing block 6 is opened, the permanent magnets 4 are removed through the through hole 501, the magnetic poles on the same side of the plurality of permanent magnets 4 are identically rearranged, and through the rotation of the rotation ring 5, the magnetic poles on the same side of all permanent magnets 4 are identically arranged. After the rearrangement of the permanent magnets 4, the sealing block 6 is reconnected to the rotation ring 5.

In the description of the present disclosure, it is to be understood that terms such as "center", "longitudinal", "transverse", "length", "width", "thickness", "up", "down", "front", "rear", "left", "right", "vertical", "horizontal", "top", "bottom", "inner", "outer", "clockwise", "anticlockwise", "axial", "radial", and "circumferential" should be construed to refer to the orientation as then described or as illustrated in the drawings under discussion. These relative terms are for convenience and simplification of description and do not indicate or imply that the device or element referred to must have a particular orientation, or be constructed and operated in a particular orientation, so these terms shall not be construed to limit the present disclosure.

In addition, the terms such as "first" and "second" are used herein for purposes of description and are not intended to indicate or imply relative importance or significance or to imply the number of indicated technical features. Furthermore, the feature defined with "first" and "second" may include at least one of this feature explicitly or implicitly. In the description of the present disclosure, "a plurality of" means two or more unless otherwise stated.

In the present disclosure, unless specified or limited otherwise, the terms "mounted", "connected", "coupled", "fixed" and the like are used broadly The terms may indicate, for example, fixed connections, detachable connections, or integral connections; may also be mechanical or electrical connections or intercommunication; may also indicate direct connections or indirect connections via intervening structures; may also indicate inner communications of two elements or interactions between two elements, unless specified otherwise. The above terms may be understood by those of ordinary skill in the art according to specific circumstances.

In the present disclosure, unless expressly specified and limited otherwise, a structure in which a first feature is "on" or "below" a second feature may include an embodiment in which the first feature is in direct contact with the second feature, and may also include an embodiment in which the first feature and the second feature are in contact with each other via intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout the present disclosure to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A magnetic liquid sealing device, comprising
a housing, a chamber being defined in the housing, the housing comprising a first housing and a second housing;
a rotating shaft passing through the housing and rotatable relative to the housing, at least a part of the rotating shaft being located in the chamber, and the first housing and the second housing being opposite to each other in an axial direction of the rotating shaft;
a first pole shoe and a second pole shoe both located in the chamber and surrounding the rotating shaft, respectively, the first pole shoe and the second pole shoe being spaced apart in the axial direction of the rotating shaft, magnetic liquid being filled between the first pole shoe and the rotating shaft, and magnetic liquid being filled between the second pole shoe and the rotating shaft;
a plurality of permanent magnets located in the chamber, located between the first pole shoe and the second pole shoe, and spaced apart in a circumferential direction of the rotating shaft, the permanent magnet being provided with a first magnetic pole and a second magnetic pole opposite to each other in the axial direction of the rotating shaft;
a rotation ring surrounding the rotating shaft and rotatable relative to the housing, the first housing, the rotation ring, and the second housing being successively connected in the axial direction of the rotating shaft, the first housing, the rotation ring, and the second housing defining the chamber, the rotation ring being located on outer sides of the plurality of permanent magnets, and the rotation ring being defined with a through hole running through the rotation ring along a radial direction of the rotating shaft; and
a sealing block configured to detachably connect to the rotation ring in the through hole, such that the plurality of permanent magnets are removable from the chamber via the through hole;
wherein a dimension of the through hole in the axial direction of the rotating shaft is D1, a demision of the permanent magnet in the axial direction of the rotating shaft is D2, D1>D2, and a dimension of the through hole in the circumferential direciton of the rotating shaft is greater than or equal to diameter of the permanent magnet.

2. The magnetic liquid sealing device according to claim 1, wherein one side of the first housing adjacent to the second housing is provided with a first annular groove, and one side of the second housing adjacent to the first housing is provided with a second annular groove, and
one side of the rotation ring adjacent to the first housing is provided with a first annular projection, one side of the rotation ring adjacent to the second housing is provided with a second annular projection, the first annular projection is fitted with the first annular groove, and the second annular projection is fitted with the second annular groove.

3. The magnetic liquid sealing device according to claim 1, wherein one side of the first pole shoe adjacent to the second pole shoe is provided with a third annular projection, one side of the second pole shoe adjacent to the first pole shoe is provided with a fourth annular projection, and an outer circumferential surface of the permanent magnet is in contact with outer circumferential surfaces of the third annular projection and the fourth annular projection, respectively.

4. The magnetic liquid sealing device according to claim 1, further comprising a first sealing ring and a second sealing ring, the first sealing ring being arranged between the rotation ring and the first housing, and the second sealing ring being arranged between the rotation ring and the second housing.

5. The magnetic liquid sealing device according to claim 1, further comprising a third sealing ring arranged between the sealing block and the rotation ring.

6. The magnetic liquid sealing device according to claim 1, further comprising a first bearing and a second bearing both located in the chamber, the first bearing and the second bearing being fitted over the rotating shaft, respectively, and being spaced apart in the axial direction of the rotating shaft, the first pole shoe, the second pole shoe, and the permanent magnets being all located between the first bearing and the second bearing.

7. The magnetic liquid sealing device according to claim 6, further comprising a first positioning member, a second positioning member, and a third positioning member all located in the chamber, the first positioning member, the second positioning member, and the third positioning member being fitted over the rotating shaft, respectively, the first bearing being located between the first positioning member and the second positioning member, and the third positioning member being located between the second pole shoe and the second bearing.

8. The magnetic liquid sealing device according to claim 1, wherein an outer circumferential surface of the first pole shoe and an outer circumferential surface of the second pole shoe are both provided with a groove, and the magnetic liquid sealing device further comprises a fourth sealing ring and a fifth sealing ring, the fourth sealing ring is arranged in the groove on the outer circumferential surface of the first pole shoe, and the fifth sealing ring is arranged in the groove on the outer circumferential surface of the second pole shoe.

9. The magnetic liquid sealing device according to claim 1, further comprising an end cover arranged on one side of the housing, the rotating shaft passing through the end cover, and the end cover being configured to seal the chamber.

* * * * *